Oct. 14, 1969  L. BLASCHKE  3,472,583
MOVIE CAMERA OR PROJECTOR FILM PRESENCE INDICATOR
Filed Aug. 24, 1967  2 Sheets-Sheet 1
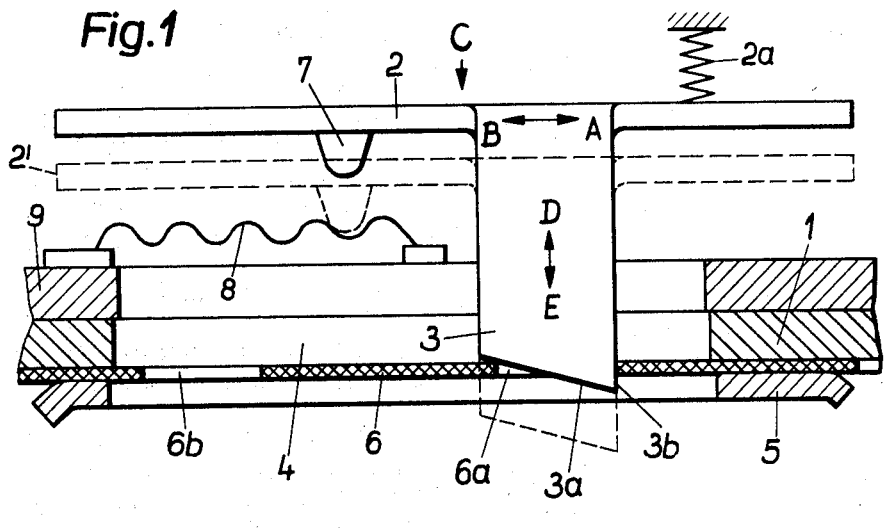
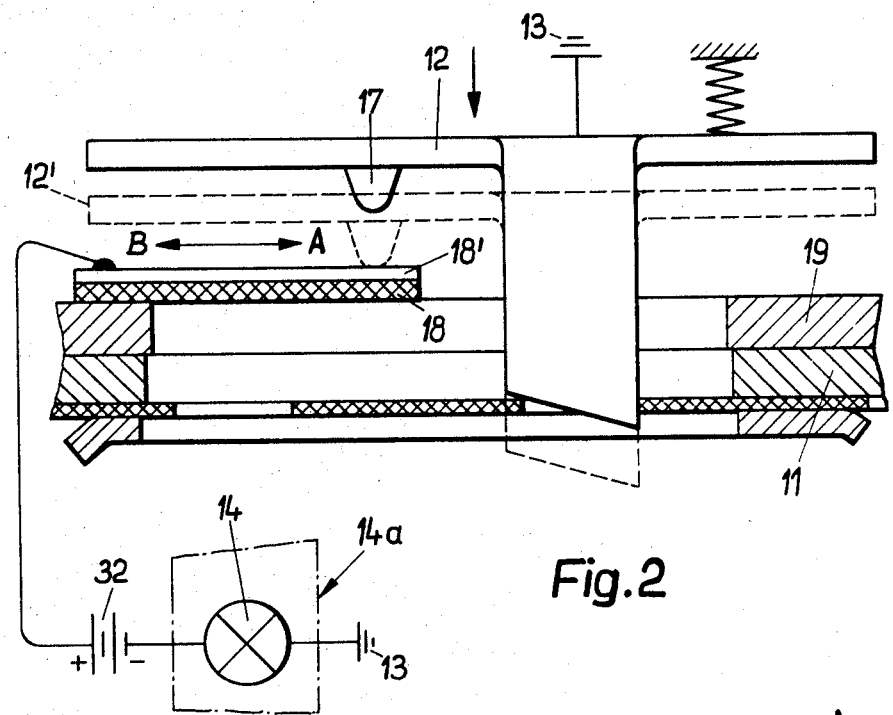
Inventor
Ludwig Blaschke
by Michael J Striker
Atty Oct. 14, 1969  L. BLASCHKE  3,472,583
MOVIE CAMERA OR PROJECTOR FILM PRESENCE INDICATOR
Filed Aug. 24, 1967  2 Sheets-Sheet 2
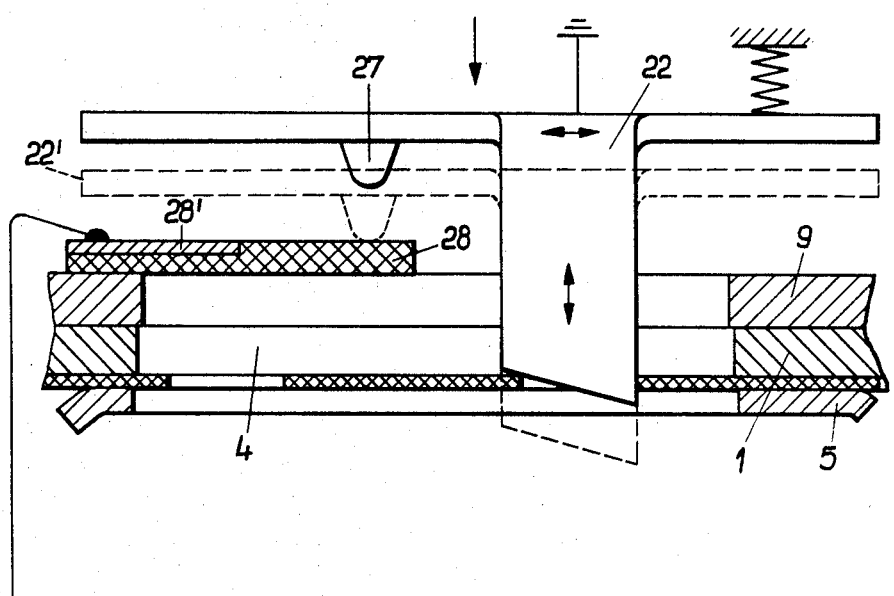
Fig.3
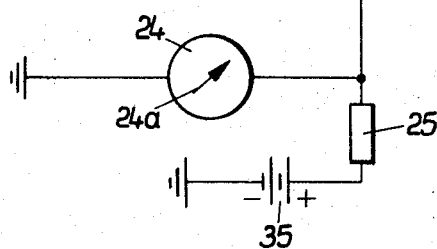
Inventor

United States Patent Office 3,472,583
Patented Oct. 14, 1969

3,472,583
MOVIE CAMERA OR PROJECTOR FILM PRESENCE INDICATOR
Ludwig Blaschke, Munich, Germany, assignor to Niezoldi & Kramer G.m.b.H., Munich, Germany
Filed Aug. 24, 1967, Ser. No. 663,145
Claims priority, application Germany, Aug. 26, 1966, N 29,077
Int. Cl. G03b 1/60, 21/50
U.S. Cl. 352—171      13 Claims

ABSTRACT OF THE DISCLOSURE

The pulldown lever of a movie camera or projector moves in a first path when the film is properly inserted into the film guide and is properly fed by the pulldown. If the film tears or if the trailing end of the film moves beyond the pulldown lever, the latter is free to move in a second path and thereby produces or causes the production of an audible, visible or otherwise detectable signal which warns the user that the supply of film is exhausted or that the film is damaged. The pulldown lever can cooperate with a diaphragm to produce audible signals or a portion thereof can constitute the movable contact of a switch which closes when the lever moves in the second path. Such closing of the switch can produce a visible signal by completing the circuit of a lamp in the viewfinder or by causing deflection of the needle in the moving coil instrument of the exposure meter in a movie camera.

BACKGROUND OF THE INVENTION

The present invention relates to movie cameras or projectors, particularly to movie cameras. Still more particularly, the invention relates to improvements in devices employed in movie cameras or projectors to indicate the absence of film, tearing of film or that the supply of exposed or unexposed film is exhausted.

It is already known to provide a movie camera with a device which indicates proper transport of film by the pulldown lever. In such cameras, the pulldown lever cooperates with a blocking lever whose pallet penetrates into a perforation of the film to arrest the film during exposure of a frame to scene light and to hold the film against movement when the pulldown lever performs a return stroke. The blocking lever carries a contact which engages a complementary contact to complete the circuit of a signal lamp when the pallet is withdrawn from a perforation whereby the lamp indicates that the film is being transported by the pulldown lever. A drawback of such signalling devices is that the lamp lights up when the film is properly transported and that the lamp is ignited and extinguished at frequent intervals so that the resulting signals might irritate the user of the movie camera. If the pulldown lever fails to transport the film, the lamp remains on or off, i.e., the user must memorize several types of signals. Furthermore, the user might not detect the signal if the lamp is turned off when the trigger of the camera is released. Also, such conventional signalling devices consume substantial amounts of energy which is undesirable in many types of movie cameras utilizing one or more small batteries or miniature cells.

SUMMARY OF THE INVENTION

It is an object of my invention to provide a novel and improved movie camera or projector wherein the absence of or damage to the film in a particular portion of the film guide is automatically indicated in a way which does not irritate the user and wherein the generation of signals takes place only when the operation is irregular, i.e., if the supply of film is exhausted or if the film has been damaged or torn.

Another object of the invention is to provide a novel signal generating device for use in movie cameras wherein such device immediately indicates that the supply of unexposed film is exhausted and/or that the film has developed a break or tear.

A further object of the invention is to provide a signal generating device which need not consume any energy and which can be readily installed in many presently known cameras or projectors for movie film.

An additional object of the invention is to provide a signal generating device which can produce visible or audible signals, which can produce signals which the operator cannot fail to detect, and which can cause certain conventional components of the camera to indicate the absence of or damage to film in a movie camera.

A concomitant object of the invention is to provide a signal generating device which occupies little room, which can employ certain essential parts of a movie camera so that such parts perform their normal functions and also contribute to generation of signals in the event that the supply of film is exhausted or that the film is damaged, and which undergoes little wear so that its life expectancy is the same as that of a movie camera or projector.

In its simplest form the improved camera or projector comprises guide means for guiding the film, film transporting means including a pulldown movable with reference to a portion of the guide means in a first path to thereby transport the film lengthwise along the guide means and in a second path in the absence of film in the aforementioned portion of the guide means, and signal generating means for indicating the absence of film in the portion of guide means. The pulldown constitutes one element of the signal generating means and the latter is operative in response to movement of the pulldown in a portion of or in the entire second path.

For example, the camera or projector may be provided with a diaphragm which is separated from a follower on the pulldown when the film is properly inserted into and properly transported along the guide means. The follower can reach the diaphragm when the film is absent so that the diaphragm then produces a sound in response to customary in-and-out and/or forward and backward movements of the pulldown.

Alternatively, the pulldown may constitute or carry one contact of an electric switch in a movie camera. The second contact of the switch may be reached by the contact on the pulldown when the film is absent whereby the contacts complete the circuit of a signal lamp in the viewfinder or cause the needle of the moving coil instrument in the exposure meter to change its position in a manner which can be readily detected by the user of the camera.

The novel features which are considered as characteristic of the invention are set forth in particular in the appended claims. The improved movie camera or projector itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary schematic sectional view of a movie camera which embodies one form of my invention and wherein the signal generating means is arranged to produce audible signals in response to absence of film in a selected portion of its guide means;

FIG. 2 is a similar fragmentary schematic sectional view of a second movie camera wherein the absence of film in a selected portion of guide means results in the generation of visible signals which can be observed by looking through the viewfinder; and FIG. 3 is a fragmentary schematic sectional view of a third movie camera wherein the absence of film in a selected portion of the guide means results in deflection of the output element in a moving coil instrument of the exposure control.

DESCRIPTION OF THE PREFERRED EMBODIMENTS

Referring first to FIG. 1, there is shown a portion of a movie camera which includes a pulldown lever 2 having a tooth or claw 3 which can advance movie film 6 stepwise, always by the length of a frame. The film guide includes a plate or wall 1 which is provided with a passage 4 for the tooth 3 and cooperates with a pressure plate 5 to hold the foremost unexposed frame of the film 6 absolutely flat in a position in which the frame can be exposed to scene light in response to opening of the shutter in a manner not forming part of the present invention. The means for biasing the pressure plate 5 against the film 6 is not shown in the drawing.

The camera comprises a customary drive for the pulldown lever 2. Such drive comprises a cam (not shown) which can move the tooth 3 in directions indicated by arrows A and B whereby the film is advanced by the length of a frame when the tooth advances forwardly (arrow A). A spring 2a serves to move the tooth 3 in the direction indicated by arrow E. Thus, when the film 6 is properly inserted into the guide and is held between the wall 1 and pressure plate 5, the pulldown lever 2 can travel in a first path to transport the film when the leading edge 3b of the tooth 3 enters a perforation 6a when the lever 2 advances in the direction indicated by the arrow A. When the lever 2 reverses the direction of its movement (arrow B), the inclined top land 3a causes the tooth 3 to move out of the perforation (arrow D) and to move backwards into registry with the next perforation 6b. The direction in which the spring 2a biases the pulldown lever 2 is indicated by an arrow C.

In accordance with the present invention, the pulldown lever 2 carries a projection or follower 7 which constitutes one element of a signal generating device. The other element of the signal generating device is constituted by an undulate diaphragm 8 having an uneven surface which is tracked by the follower 7 when the lever 2 is permitted to follow the bias of the spring 2a and to assume its broken-line position 2'. The lever then travels in a second path but only when the film 6 is absent from that portion of the guide which defines the passage 4 or when the film tears so that it can yield to the pressure of the spring 2a. As the drive continues to move the lever 2, the latter travels in its second path whereby the follower 7 cooperates with the diaphragm 8 to produce an audible signal which warns the operator that the supply of unexposed film is exhausted or that the film has developed a break. The diaphragm 8 is mounted on a second wall 9 which is adjacent to the wall 1 and can be said to form part of the film guide. For example, the wall 9 can constitute an internal partition of the camera body. It suffices if the lever 2 is free to reciprocate while the follower 7 engages the diaphragm 8 (i.e., if the lever moves in directions indicated by arrows A and B while assuming the broken-line position 2'); the diaphragm will then produce a sound to warn the operator that the camera is not ready to make further exposures.

FIG. 2 illustrates a portion of a second movie camera wherein the parts 11 and 19 respectively correspond to the parts 1 and 9 of FIG. 1. The pulldown lever is shown at 12 and this lever consists of current-conducting material and is grounded at 13. A projection 17 of the lever 12 constitutes the movable contact of a normally open electric switch whose other contact 18' is mounted on an insulator 18 carried by the wall 19. When the lever 12 is permitted to move in its second path (see the broken-line position 12'), the contact 17 engages the contact 18' and completes an electric circuit which includes a battery 32 or another suitable source of electrical energy and a suitable lamp 14 which is preferably installed in or adjacent to the viewfinder 14a of the camera. The lamp 14 is connected between the ground (13) and the negative terminal of the battery 32. The positive terminal of the battery is connected with the contact 18'. The length of the contact 18' is selected in such a way that the switch remains closed while the lever 12 assumes the broken-line position 12' and regardless of whether the lever moves forwardly (arrow A) or rearwardly (arrow B). The battery 32 may also serve to supply energy to the motor which drives the pulldown lever 12 and the shutter of the movie camera. The lamp 14 lights up and produces a visible signal which can be detected by looking through the viewfinder 14a so that the user knows that the film is damaged or that the supply of unexposed film is exhausted.

Referring finally to FIG. 3, the film guide is constructed in the same way as described in connection with FIG. 1 and the pulldown lever 22 is similar to the lever 12 of FIG. 2. The wall 9 carries an insulator 28 and the latter carries a fixed contact 28' which is shorter than the contact 18'. The lever 22 is grounded and has a follower or movable contact 27 which engages the insulator 28 or contact 28' when the film 6 is absent from that portion of the film guide which defines the channel 4.

The camera further comprises an exposure meter which includes a customary moving coil instrument 24 provided with an output element in the form of a needle 24a. The instrument 24 is connected in series with a light-sensitive resistor 25 and with a battery 35. Thus, the position of the output element 24a is normally a function of the intensity of scene light which impinges upon the light-sensitive surface of the resistor 25. The switch including the contacts 27, 28' is connected in parallel with the moving coil instrument 24 and in series with a fixed resistor 26 of low ohmic resistance. The fact that the contact 28' is relatively short, i.e., that it is engaged by the contact 27 only during movement of the lever 22 in a certain portion of the second path (position 22'), contributes to rapid detection of the signal which is produced when the switch is closed. Such closing causes the output element 24a to swing rapidly from the position determined by the light-sensitive resistor 25 whereby the operator notes the movement of the output element and knows that the supply of unexposed film is exhausted or that the film is damaged. The output element 24a will swing back and forth when the lever 22 travels back and forth in the position 22' because the length of the contact 28' is preferably about half the length of the stroke of the lever, and such swinging movements of the element 24a are immediately detected by the user of the camera.

It is further clear that the camera of FIG. 2 can be provided with a shorter contact 18' to insure that the lamp 14 is turned on and off and is even more likely to attract the user's attention.

A very important advantage of the improved signal generating device is that it remains idle when the film is properly transported by the pulldown and when the film is not defective. The solution shown in FIG. 1 can be used with advantage in movie cameras which do not employ a source of electrical energy. The solutions shown in FIGS. 2 and 3 are useful in electrically operated movie cameras. The solution shown in FIG. 1 can also be used in a projector to indicate that the film has been fully collected by the takeup reel. The embodiment of FIG. 2 is particularly advantageous because it produces a visible signal which can be detected by the user even if the camera is used in a city where the traffic noise might suppress an audible signal, in sports arenas where the cheering of spectators might drown the audible sound or in rain or storm when the user is also likely to miss the sound produced by scratching of a diaphragm or the like.

The output element 24a of the moving coil instrument 24 shown in FIG. 3 is preferably installed in the viewfinder so that its oscillations will be detected when the camera is in normal use and the operator looks through the viewfinder.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a movie camera or projector, a combination comprising guide means for guiding the film; film transporting means including a pulldown movable with reference to a portion of said guide means in a first path to thereby transport the film lengthwise along said guide means and in a second path in the absence of film in said portion of said guide means; and signal generating means for indicating the absence of film in said portion of said guide means, said pulldown constituting one element of said signal generating means and the latter being operative in response to movement of said pulldown in said second path.

2. A combination as defined in claim 1, wherein said signal generating means comprises a second element cooperating with said pulldown when the latter moves in said second path.

3. A combination as defined in claim 2, wherein said second element has an uneven surface and said pulldown comprises a follower tracking said uneven surface to thereby produce audible signals during movement of said pulldown in said second path.

4. A combination as defined in claim 3, wherein said second element comprises an undulate diaghragm.

5. A combination as defined in claim 2, wherein said pulldown constitutes the movable contact and said second element constitutes the second contact of a normally open electric switch which closes at least during a portion of movement of said pulldown in said second path.

6. A combination as defined in claim 5, wherein said signal generating means further comprises a lamp arranged to produce a visible signal in response to closing of said switch.

7. A combination as defined in claim 6, further comprising a viewfinder, said visible signal being detectable by a person looking through said viewfinder.

8. A combination as defined in claim 5, wherein said signal generating means further comprises exposure meter means connected in circuit with said switch and having an output element arranged to change its position in response to closing of said switch.

9. A combination as defined in claim 8, wherein said exposure meter means comprises a moving coil instrument and said output element constitutes the needle of said instrument.

10. A combination as defined in claim 5, wherein said second contact is positioned in such a way that the switch closes only during a predetermined portion of movement of said pulldown in said second path.

11. A combination as defined in claim 10, wherein said signal generating means further comprises insulator means engaged by said movable contact during a second portion of movement of said pulldown in said second path.

12. A combination as defined in claim 1, further comprising means for permanently biasing said pulldown into said second path, said biasing means being opposed by the film when the film is present in said portion of said guide means.

13. A combination as defined in claim 12 wherein, during movement from said first to said second path, the pulldown moves into a passage provided therefor in said guide means.

References Cited

UNITED STATES PATENTS

| | | | |
|---|---|---|---|
| 2,213,741 | 9/1940 | Mihalyi | 116—114 |
| 3,335,695 | 8/1967 | Hayashi | 352—172 X |
| 3,377,982 | 4/1968 | Katsuyama | 352—171 X |

NORTON ANSHER, Primary Examiner

A. MATHEWS, Assistant Examiner

U.S. Cl. X.R.

116—67, 114; 352—92, 170